United States Patent Office 3,518,056
Patented June 30, 1970

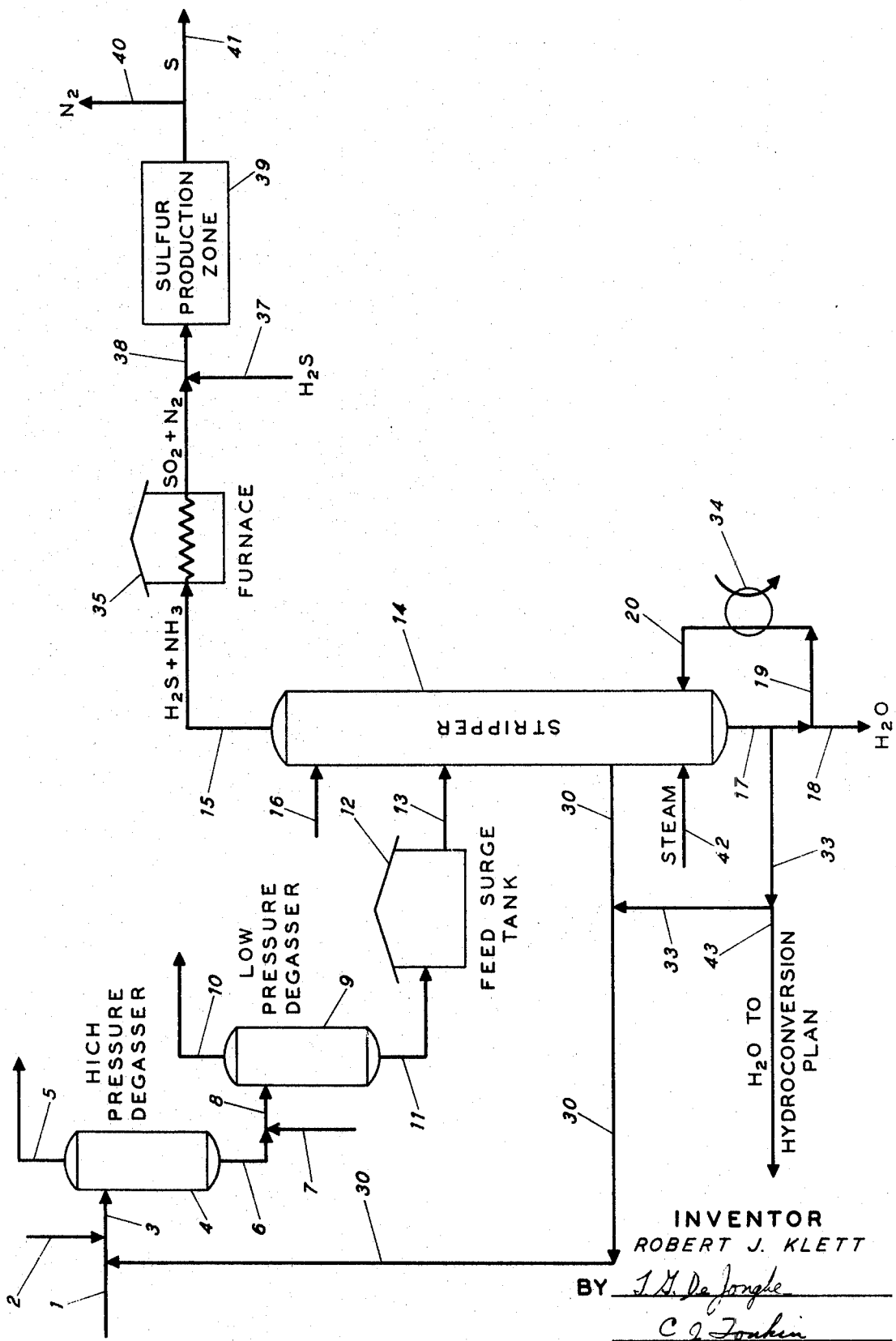

3,518,056
HYDROGEN SULFIDE RECOVERY BY DEGASSING, DISTILLATION AND AMMONIA RECYCLE WITH SUBSEQUENT SULFUR PRODUCTION
Robert J. Klett, San Francisco, Calif., assignor to Chevron Research Company, San Francisco, Calif., a corporation of Delaware
Filed Sept. 26, 1968, Ser. No. 762,773
Int. Cl. B01d 3/06, 19/00; C01b 17/02
U.S. Cl. 23—225
9 Claims

ABSTRACT OF THE DISCLOSURE

Operation of a process to remove $H_2S$ from an aqueous solution of $H_2S$, $NH_3$, and light hydrocarbons under superatmospheric pressure, wherein an aqueous solution of $H_2S$ and $NH_3$ is fed to a stripper, is improved in that aqueous feed solutions of substantial or high $H_2S$ content are more advantageously handled by (1) combining an $NH_3$-rich, $H_2S$-lean liquid stream withdrawn from the side of the stripper and/or from the bottom of the stripper with the aqueous solution of $NH_3$, $H_2S$, and light hydrocarbons; then (2) removing light hydrocarbons as gases by reducing the pressure on the combined solution; (3) providing residence time for the combined solution; and then (4) feeding the combined aqueous feed stream to the stripper.

BACKGROUND OF THE INVENTION

Field of the invention

This invention relates to methods for removing $H_2S$ from aqueous streams comprised of $H_2S$ and $NH_3$.

Description of the prior art

In many hydroconversion processes applied to hydrocarbon oils, shale oil, tar sands, etc. of which catalytic hydrogenation, hydrofining or hydrodesulfurization and hydrocracking are typical examples, $H_2S$ and $NH_3$ are produced as a result of reaction of hydrogen with sulfur compounds and nitrogen compounds contained in the oil. Sometimes this conversion of one or the other or both of the sulfur and nitrogen compounds is the desired reaction, while in other cases it is merely an incidental reaction. In a typical process, normally liquid hydrocarbon oil containing nitrogen compounds and sulfur compounds and recycle hydrogen-rich gas and makeup hydrogen are passed through a reaction zone, usually containing a catalyst, at elevated temperature and pressure at which at least a portion of the hydrocarbons are vaporized; and there is obtained as a reaction zone effluent a mixture of vaporized hydrocarbons, hydrogen, $H_2S$ and $NH_3$. The effluent may also contain heavier hydrocarbons which are liquid at the reaction conditions. The reaction effluent is cooled to condense vaporized hydrocarbons, whereby the liquid hydrocarbons can be separated from hydrogen-rich recycle gas, which is then reused in the process.

When the reaction effluent contains both $H_2S$ and $NH_3$, it has been found that on cooling to temperatures below about 300° F. the $H_2S$ and $NH_3$ may react to form salts which sometimes cause clogging problems in the heat exchangers and the lines. Injection of water into the reaction effluent upstream of the heat exchangers has been used to wash out such deposits and/or to prevent their forming. This water injection can provide a means of removing much of the $NH_3$ formed, if rather large amounts of water are injected sufficient to dissolve the $NH_3$.

In a typical hydroconversion process, such as hydrotreating or hydrocracking, there are considerable amounts of light hydrocarbons and hydrogen present in the reaction effluent. Upon washing $H_2S$ and $NH_3$ out of the reaction effluent, a portion of these light hydrocarbons, as well as a small portion of the hydrogen, will dissolve in the water phase, particularly if the washing is at a high pressure. In many hydroconversion processes, the washing is done at a pressure of 500 to 5,000 p.s.i.g., more typically 1,000 to 3,000 p.s.i.g. For example, in hydrotreating gas oil, the effluent from the hydrotreater typically is cooled by heat exchange to a temperature between about 100 and 150° F. at a pressure of 2,000 p.s.i.g. Because the water is mixed with the gaseous effluent from the hydrotreater reactor at high pressure and before the effluent is cooled to 100 to 150° F., significant amounts of light hydrocarbons, such as methane, ethane, propane, butane, etc., will dissolve in the water.

These light hydrocarbons, as well as dissolved hydrogen, may be removed from the aqueous phase prior to treatment to remove $H_2S$ and $NH_3$ by reducing the pressure on the aqueous solution. It is desirable to retain $H_2S$ in the aqueous solution when the pressure is reduced because (1) the $H_2S$ is an impurity in the light hydrocarbon vapors; and (2) the $H_2S$ is preferably recovered in a single concentrated stream as a valuable byproduct in a subsequent $H_2S$ recovery process. However, in many instances, the content of $H_2S$ in the aqueous solution which is formed—e.g., in the overhead system of strippers or fractionators associated with hydroconversion processes—is too high for the $H_2S$ to be substantially completely retained in the solution when the pressure is reduced.

The present application is directed to $H_2S$ and $NH_3$ recovery wherein only one stripping column is used. One column operation for separate recovery for $H_2S$ and $NH_3$ is described in U.S. Pat. 3,335,071, issued to W. M. Bollen et al. and assigned to Chevron Research Company, and is illustrated in one embodiment in FIG. 2. The disclosure of U.S. Pat. 3,335,071 is incorporated by reference into the present specification. In the process described in U.S. Pat. 3,335,071 an aqueous solution of $H_2S$ and $NH_3$ may be treated according to the following steps:

(a) Stripping $H_2S$ out of the second aqueous solution in a distillation column to obtain an $H_2S$-rich overhead stream;

(b) Removing a vapor sidestream comprised of $NH_3$, $H_2S$ and $H_2O$ from the distillation column;

(c) Partially condensing the $NH_3$-rich vapor sidestream to obtain an $NH_3$-rich vapor and $NH_3$-rich condensate; and (d) Recycling a portion of the $NH_3$-rich aqueous overhead condensate to the distillation column.

No $NH_3$-rich aqueous stream is required to be recycled to the degassing section according to the process disclosed in U.S. Pat. 3,335,071.

Thus, according to practices employed under the prior art, considerable amounts of $H_2S$ may be lost from the aqueous solution desired to be treated for removal of $H_2S$ or $H_2S$ and $NH_3$ from aqueous solutions when the pressure is reduced on the aqueous solution so as to remove light hydrocarbons and/or hydrogen dissolved in the aqueous solution of $H_2S$ and $NH_3$.

SUMMARY OF THE INVENTION

According to the present invention, in a process for removing $H_2S$ or $H_2S$ and $NH_3$ from a first aqueous solution comprised of $H_2S$, $NH_3$, and light hydrocarbons under superatmospheric pressure according to the steps:

(a) Degassing the first aqueous solution by reducing the pressure, thereby removing light hydrocarbons and obtaining a second aqueous solution comprised of $H_2S$ and $NH_3$; and (b) Stripping H₂S out of the second aqueous solution in a distillation column to obtain an H₂S-rich overhead stream.

The improvement is made which comprises:

(c) Stripping NH₃ out of the aqueous bottoms stream of reduced H₂S content in a second distillation column to obtain an NH₃-rich vapor overhead;

(d) Combining at least a portion of the NH₃-rich aqueous solution with the first aqueous solution to obtain a combined aqueous solution; then (e) Removing at least a portion of the hydrocarbons contained in the first aqueous solution in a degassing zone as vapors by reducing the pressure on the combined aqueous solution to obtain said second aqueous solution; and then (f) Passing the second aqueous solution to the distillation column.

The recycle of the NH₃-rich aqueous solution from the distillation column or stripper to the degassing zone serves to retain H₂S in the aqueous phase while degassing light hydrocarbons and/or hydrogen from the aqueous feed containing the H₂S–NH₃.

According to the present invention, NH₃-rich aqueous solution is recycled to the degassing zone where it achieves or closely approaches equilibrium with the net feed to the stripper; and fluctuations in the feed composition are dampened out due to the extra residence time. A residence time of at least five minutes after combining the aqueous streams and prior to introduction to the stripper is desirable. Much more preferable, a residence time of about one to three hours is provided for the combined gross feed streams of recycle NH₃-rich aqueous solution and net H₂S–NH₃ aqueous feed solution. Still more preferable, a residence time of between about 3 and 24 hours or longer is provided for the combined, that is gross, feed streams. Provision for residence time for the recycle NH₃-rich aqueous solution prior to introduction to the stripper is in contrast to previous operation wherein the recycle of NH₃-rich condensate was directly to the stripper.

Also, it has been found that, if a residence time of about 24 hours or longer is used, then oil may be essentially completely separated from the foul water feed streams so that the strippers are kept cleaner. Additionally, when the feed streams include foul water from fluid catalytic cracking units or the like, the residence time of about 24 hours or longer will allow hydrocyanide acids which are likely to be present in such foul water streams to be converted to thiocyanate. Conversion of the hydrocyanide to thiocyanate helps minimize corrosion problems in the strippers.

It has been found that with the recycle of the NH₃-rich aqueous solution large amounts of H₂S in the aqueous feed streams to the present process may be dealt with without excessive losses of H₂S in the light hydrocarbons and/or hydrogen from the degassing step. Under most conditions, the H₂S content of the gases from the degassing step is very low. The degasser off-gases may be used as refinery fuel gas as only a very small amount of SO₂ will be produced by burning the gases. Thus air pollution is substantially reduced.

A number of streams containing H₂S and/or NH₃ may be treated in the process of the present invention, but it is preferable that there be a vessel or some means to provide residence time and allow mixing of the NH₃-rich aqueous solution and the net feed to the present process. For example, there may be provided simply a surge vessel with no removal of light hydrocarbons or a degasser to remove light hydrocarbons from at least one of the feed streams to the present process. In the more usual case, it is necessary to provide a degassing step which in many instances results in loss of H₂S and/or extra expense to remove H₂S from the light hydrocarbons when not using the process of the present invention. As indicated above, the H₂S contents of the net feed streams may be relatively high in the present process but still dealt with without large H₂S losses or H₂S impurities in the degasser zone off-gases. The recycle of the NH₃-rich aqueous solution to the degasser zone serves to retain H₂S in the aqueous phase.

In the process of the present invention, it has been found that it is advantageous to use two stages of degassing. Use of two stages of degassing serves to further minimize the H₂S losses in the light hydrocarbon streams which are removed from the aqueous solution when the pressure is reduced on the aqueous solution in the degassing zone. The first stage of degassing is a high pressure degassing stage wherein the pressure is maintained between 50 and 500 p.s.i.g. Preferably the pressure is maintained at about 70 to 200 p.s.i.g. The liquid phase aqueous solution from the high pressure degassing stage is then passed to a low pressure degassing stage.

Aqueous streams containing H₂S and/or NH₃ together with small amounts of light hydrocarbons, which light hydrocarbons are dissolved in the aqueous solution due to relatively low pressures, for example, 10 p.s.i.g. to 100 p.s.i.g., are advantageously introduced to the process of the present invention by combining such streams with the aqueous solution fed to the low pressure degasser. The low pressure degasser is maintained at a pressure between 0 p.s.i.g. and 50 p.s.i.g., preferably between 1 p.s.i.g. and 10 p.s.i.g.

BRIEF DESCRIPTION OF THE DRAWING

The drawing schematically illustrates a preferred embodiment of the present process for removing H₂S or H₂S and NH₃ from aqueous solutions wherein two degassing stages are used and sulfur is produced from the H₂S.

DETAILED DESCRIPTION OF THE DRAWING AND THE INVENTION

Referring now in more detail to the drawing, an aqueous feed stream containing H₂S and NH₃ is introduced to the process via line 1. In a preferred embodiment of the present invention, this aqueous feed stream is obtained by commingling or contacting the effluent from a hydrocracking reactor at a pressure of about 2,000 p.s.i.g. with water. As indicated in the discussion under "Background of the Invention," this contacting is carried out to remove NH₃ and H₂S from the hydrocracker reactor effluent. Because the hydrocracker reactor effluent contains substantial amounts of hydrogen and light hydrocarbons, the aqueous solution which is formed is comprised of hydrogen and light hydrocarbons in addition to H₂S and NH₃.

In the process of the present invention, this aqueous solution is combined with the recycle NH₃-rich aqueous stream obtained from the stripper, as will be described in more detail hereinbelow. The NH₃-rich aqueous solution is recycled via line 30.

A stream rich in H₂S obtained from the overhead of the stripping distillation columns used to remove light hydrocarbons from the hydrocracker effluent product is introduced to the process via line 2. Among the many H₂S-rich streams that may be treated in the process of the present invention are those streams derived from steam stripping liquid hydrocarbon effluents from hydrotreating or hydrofining processes. These liquid hydrocarbon effluents contain H₂S and light hydrocarbons which are removed by stripping or distillation. The stripper or distillation column overhead vapors which result from the stripping operation contain appreciable amounts of H₂S which dissolve to a significant extent in the water formed when the overhead is partially condensed. Frequently the stripping is carried out at low pressures, for example, 5 to 50 p.s.i.g., in the overhead accumulator. In this instance, these overhead condensate streams may be introduced to the process of the present invention via line 7. It is particularly important to remove light hydrocarbons from the overhead condensate streams when the $H_2S$, which is removed from the $H_2S$ stripper via line 15, is desired in a highly purified form. For example, when the $H_2S$ is to be used as feed to a Claus process for manufacture of sulfur, it is desirable that the $H_2S$ stream contain less than 0.1 volume percent hydrocarbons.

In some instances, the hydrocarbon effluent from the hydrotreating or hydrocracking process will be stripped or fractionated to remove $H_2S$ and light hydrocarbons at a pressure above 50 p.s.i.g. For example, in U.S. Pat. 3,356,608, a process is described wherein gas oil and hydrogen are contacted with a sulfactive hydrogenation catalyst and the effluent hydrocarbon stream, after separation of recycle hydrogen, is steam stripped at pressures above 150 p.s.i.g. Upon condensing the overhead from the stripper, an aqueous phase is formed which may be very rich in $H_2S$ compared to aqueous solutions formed in the presence of $H_2S$ at lower $H_2S$ partial pressures.

Referring again to the drawing, the combined streams 1, 2 and 30 are introduced via line 3 to the high pressure degasser 4. In order to achieve low $H_2S$ contents in the off-gases, the high pressure degasser is preferably maintained at a pressure of about 185 p.s.i.g. and a temperature of about 80° F. Lower pressures and higher temperatures will result in increased $H_2S$ contents in the off-gas. Light hydrocarbons and hydrogen are removed via line 5 from the top of the high pressure degassing vessel. When operating at about 100 to 200 p.s.i.g. and 80 to 100° F., the $H_2S$ content of stream 5 is generally less than 3 volume percent. When operating at high pressure and low temperature for the high pressure degasser in accordance with the present invention, the $H_2S$ content may be maintained between about 0.1 to 2.0 volume percent. Thus stream 5 has a low $H_2S$ content and is generally suitable as refinery fuel gas. The partially degassed aqueous solution is withdrawn from the bottom of the high pressure degasser via line 6.

An aqueous solution of $H_2S$, $NH_3$ and small amounts of dissolved hydrocarbons, which aqueous solution is obtained as overhead condensate from a hydrocarbon stripper operating at an overhead pressure of about 50 p.s.i.g., is introduced via line 7. The combined aqueous streams in lines 6 and 7 are passed via line 8 to low pressure degasser 9. The low pressure degasser is preferably maintained at a pressure of about 2 p.s.i.g. Light hydrocarbons are withdrawn in line 10 from the low pressure degasser, and an aqueous solution of $H_2S$ and $NH_3$ is withdrawn from the bottom of the degasser via line 11. The $H_2S$ content of stream 10 is generally less than about 4 volume percent when operating in accordance with the present invention. The percent of $H_2S$ in the low pressure degasser off-gases may be reduced further, for example, to the range for the high pressure degasser, by increasing the amount of $NH_3$-rich condensate and by lowering the temperature and raising the pressure. In most instances, the major portion of the off-gases, which are mostly hydrogen and methane, are released in the high pressure degasser. Usually about 80 to 90 volume percent of the dissolved gases flash off in the high pressure degasser. Therefore, there is only a relatively small quantity of $H_2S$ carried off with the off-gases from the low pressure degasser. Thus, in accordance with the present invention, nearly all the $H_2S$ is left in the aqueous phase so that it may be recovered as one overhead stream from the $H_2S$ stripper.

The aqueous solution from the low pressure degasser is introduced to feed surge tank 12 wherein a residence time preferably between 3 and 24 hours is provided. The feed surge tank 12 should be a floating roof tank or inert gas blanketed. If air is allowed to come in contact with the aqueous solution, hydrogen sulfide will be oxidized to form free sulfur.

Aqueous solution is withdrawn from the feed surge tank via line 13 and introduced to stripper 14. Due to heat input in the bottom of the stripper, hot upflowing vapors are generated which serve to strip $H_2S$ out of the aqueous solution. $NH_3$ may be removed out the bottom of stripper 14 together with water in line 18 if there is available disposal facilities for water containing $NH_3$ or if economic further processing is available.

If it is desired to remove a large part or to particularly remove substantially all of the $NH_3$ out the lower part of stripper 14 than it is preferred to introduce the cooled stream of water via line 16 to the upper part of the $H_2S$ stripper so as to generate a cooler downward flowing aqueous stream which serves to fractionate the $NH_3$ from the $H_2S$. Operating in this manner a relatively poor stream of $H_2S$ is withdrawn via line 15 from the top of the stripper. The $NH_3$ content in this $H_2S$ stream operating in this manner is usually less than 2 to 5 weight percent, commonly as low as a few tenths of a percent; and preferably, the stripper conditions are maintained so as to result in an $NH_3$ content of less than 100 p.p.m., for example, 10 to 30 p.p.m.

In a preferred embodiment of the present invention, the $NH_3$ is stripped overhead. The combined $H_2S$ plus $NH_3$ stream from the stripper is burned in furnace 35 to form $SO_2$ plus nitrogen and trace amounts of nitric oxides. The $SO_2$ and nitrogen are passed via line 36, together with an independent stream of $H_2S$ introduced via line 37, to sulfur production zone 39 for the production of sulfur.

Sulfur production zone 39 may be a reaction zone in accordance with or similar to that described in U.S. Pat. 3,393,050. In accordance with U.S. Pat. 3,393,050 a method is provided for the catalytic conversion of hydrogen sulfide into free sulfur by the use of an oxidizing gas, such as oxygen or sulfur dioxide, under conditions such that the heat generated by the resulting reaction and the product sulfur thus formed are removed simultaneously from the reaction zone.

Alternatively, sulfur production zone 39 may comprise a Claus plant or variation of a Claus plant.

Fundamentally the Claus process (sometimes also referred to as the Claus-Chance process) involves reacting ⅓ mol of hydrogen sulfide with ⅔ mol of sulfur dioxide to form sulfur. Sulfur dioxide is reacted with unburned $H_2S$ in the presence of a surface-active catalyst such as bauxite at about 600° F. to form sulfur and water vapor. The sulfur is condensed to the liquid form and pumped to storage or to tank cars for shipment or to storage space where it is allowed to solidify. It is thereafter handled as a solid. In these fundamental operations there are several variations in practice:

(1) Combustion of $H_2S$—Assuming the $H_2S$ is not contaminated with $NH_3$, this operation may be carried out by either passing all of the $H_2S$ into the combustion chamber with the calculated amount of air to oxidize ⅓ of the $H_2S$ or by splitting the $H_2S$ stream before it enters the combustion chamber. In some cases the hydrogen sulfide is accompanied by inert gases resulting in design difficulties. Inert gases may be present to such an extent that the gas stream will not support combustion. In some cases this problem can be handled by expensive absorption and desorption techniques. In this way the $H_2S$ concentration is increased sufficiently to support combustion.

(2) Reaction of hydrogen sulfide and sulfur dioxide—This operation is fairly uniform in the various plants. Although several catalysts of sufficient surface activity can be used, activated bauxite is the most common as it is durable and inexpensive.

(3) Condensation of sulfur vapors—This operation is carried out by several methods. The sulfur can be condensed by waste heat boiler type condensers, by air cooled condensers or by contacting with molten sulfur in a packed tower. The stream of molten sulfur must be cooled in this operation and this may be done in conventional shell and tube coolers or submerged coils.

When feeding the combined stream of $H_2S$ plus $NH_3$ to furnace 35 and then to sulfur production zone 39 in accordance with a preferred embodiment of the present invention, inert nitrogen is fed to the sulfur production zone. This increases the size of the sulfur plant but simplicity of the overall foul water plant design makes this operation attractive in some instances compared to modes of operation wherein $H_2S$ and $NH_3$ are recovered separately as described in my two applications entitled "Hydrogen Sulfide and Ammonia Recovery" filed the same day as the present application. The disclosure of these two patent applications just mentioned are incorporated by reference into the present application.

The nitrogen which passes through zone 39 as an inert is removed from the process via line 40.

An alternative embodiment of the present invention involves passing all or a substantial part of the $SO_2$ and $N_2$ to an acid manufacturing zone for the production of $H_2SO_4$ and/or $H_2SO_3$.

Referring again to stripper 14, if the stripper is operated at relatively high temperature and superatmospheric pressure, then high purity water may be obtained for withdrawal via line 18. Preferred temperatures in order to obtain high purity water are 300 to 370° F. and preferred pressures are 20 to 400 p.s.i.g., usually 58 to 160 p.s.i.g.

In a preferred embodiment of the present invention stripper 14 is operated at low pressure, for example, atmospheric pressure, up to about 20 or 30 p.s.i.g. In this operation low pressure steam may be used as the stripping medium and introduced into stripper 14 via line 42. Temperatures usually will range between 210° F. to about 250 or 280° F. At these lower temperatures and pressures, there is usually considerably more $NH_3$ present in the bottoms water withdrawn in line 17 from the stripper. More importantly, it is further found that the ratio of $NH_3$ to $H_2S$ at these temperatures is considerably higher than the ratio of $NH_3$ to $H_2S$ at the higher temperatures previously mentioned. The bottoms stream containing substantial amounts of $NH_3$ and a relatively high ratio of $NH_3$ to $H_2S$ is advantageously recycled via lines 33 and 30 to high pressure degasser 4. Furthermore, in this preferred mode of operation it is preferred to recycle a portion of the bottoms to a hydroconversion plant via line 34. The aqueous stream passed to the hydroconversion plant via line 34 is used to scrub $H_2S$ out of the gaseous effluent from the hydroconversion plant. The $H_2S$–$NH_3$ aqueous solution thus formed is fed to the present process as indicated by line 1.

In the present invention it is preferred to control the amount of $NH_3$-rich aqueous solution which is recycled, as well as the ratio of $NH_3$ to $H_2S$ in the recycle, so that the ratio of $NH_3$ to $H_2S$ of the combined streams fed to the high pressure degasser is at least 1.1:1.0 on a molar basis. For streams which contain more than a percent or two of dissolved $NH_3$ and $H_2S$ it is preferable to use more recycle $NH_3$-rich condensate, so that the ratio of $NH_3$ to $H_2S$ (calculated as separate species) is at least 1.2 to 1.0, and in many instances it is preferred to have as much as one and one-half to about five times as much $NH_3$ as $H_2S$. The amount of $NH_3$ in the $NH_3$-rich aqueous solution, the ratio of $NH_3$ to $H_2S$ is controlled primarily by the position of withdrawal (for example, the tray number) from stripper 14 and also the temperature and pressure existing at the bottom of 14 and also the temperature profile existing along the length of stripper 14.

In this application, $NH_3$-rich, broadly speaking, means the molar concentration of $NH_3$ is greater than the molar concentration of $H_2S$. More usually, $NH_3$-rich connotes more than about 2 or 3 mols of $NH_3$ per mol of $H_2S$ in the stream referred to. For product $NH_3$-rich streams the ratio of mols $NH_3$ to mols $H_2S$ is usually greater than 9 to 1, and frequently as high as 50 or 100 to 1.

Also, in this application the terms stripper and distillation column are used interchangeably. Distillation column is meant to include any means to separate components such as $H_2S$ or $NH_3$ from water by means of differences in equilibrium vaporization values or by virtue of relative volatilities being greater than one.

EXAMPLE

This example illustrates the advantages obtained using the process of the present invention for treating aqueous streams which contain large amounts of $H_2S$ relative to $NH_3$ in addition to light hydrocarbons and/or hydrogen dissolved in the aqueous stream due to high pressure.

A solution comprised of about 984 pounds of $H_2S$, 516 pounds of $NH_3$, and about 760 standard cubic feet of hydrogen plus light hydrocarbons dissolved in 27,820 pounds of $H_2O$ is obtained by water washing a hydrocracker reactor effluent. The hydrocracker reactor effluent stream which is water washed is at about 250° F. and 1,250 p.s.i.g. The aqueous stream thus obtained is introduced via line 1 to the process schematically illustrated by the drawing, except that there is no recycle $NH_3$-rich condensate to the high pressure degasser.

An aqueous solution comprised of 28,000 pounds of $H_2O$, 436 pounds of $H_2S$ and only trace amounts of $NH_3$ is obtained as overhead condensate from a fractionating column in the fractionation section of the hydrocracking unit. This stream is introduced via line 2 to the process. In this first instance there is no recycle of $NH_3$-rich aqueous solution to the stripper. The abovementioned streams and the resulting streams corresponding to the numbered streams shown in the drawing are summarized in the Table below:

TABLE I

| Stream No. | $H_2O$, lb./hr. | $H_2S$, lb./hr. | $NH_3$, lb./hr. |
| --- | --- | --- | --- |
| 1 | 27,820 | 984 | 516 |
| 2 | 28,000 | 436 | 0 |
| 3 | 55,820 | 1,420 | 516 |
| 5 | 2 | 390 | 0 |
| 8 | 55,818 | 1,030 | 516 |
| 10 | 1 | 10 | 0 |
| 11 | 55,817 | 1,020 | 516 |
| 15 | 9 | 1,015 | 499 |

The combined streams 5 and 10 contain about 760 s.c.f. of hydrogen plus light hydrocarbons.

Using the process of the present invention, identical streams 1 and 2 are fed to the process schematically illustrated in the drawing. In addition, a portion of the sidestream $NH_3$-rich aqueous solution from the stripper is recycled via line 30 to the high pressure degasser. This recycle stream is rich in $NH_3$ relative to $H_2S$. The mols $NH_3$ in the recycle stream are 26.2; the mols $H_2S$ total 8.7, thus resulting in a molar ratio of $NH_3$ to $H_2S$ of about 3.01. There is sufficient $NH_3$ in the $NH_3$ recycle via line 30 so that the resulting combined streams in line 3 have a ratio of $NH_3$ to $H_2S$ on a molar basis greater than 1.0. Preferably, the ratio of $NH_3$ to $H_2S$ in stream 3 is maintained above 1.1. In this example, the ratio of $NH_3$ to $H_2S$ is 1.22. The feed streams and resulting streams are summarized below:

TABLE II

| Stream No. | $H_2O$, lb./hr. | $H_2S$, lb./hr. | $NH_3$, lb./hr. |
| --- | --- | --- | --- |
| 1 | 27,820 | 984 | 516 |
| 2 | 28,000 | 436 | 0 |
| 30 | 568 | 148 | 444 |
| 3 | 56,388 | 1,568 | 960 |
| 5 | 1 | 2 | 0 |
| 8 | 56,388 | 1,564 | 960 |
| 10 | 1 | 2 | 0 |
| 11 | 56,387 | 1,562 | 960 |
| 15 | 9 | 1,411 | 499 |

The combined streams 5 and 10 contain about 760 s.c.f. of hydrogen plus light hydrocarbon gases.

As can be seen from the comparison of streams 5 and 10 in Table II to streams 5 and 10 in Table I, the $H_2S$ losses are drastically reduced. Using the process of the present invention, the $H_2S$ losses are reduced from 400 pounds per hour (Table I) to 4 pounds per hour (Table II). Thus the process of the present invention results in reducing the $H_2S$ present in the flashed off gases by a factor of 100 in this example. Thus recycling $NH_3$-rich aqueous solution from the stripper is of particular advantage when feeding streams which have relatively large amounts of $H_2S$ compared to $NH_3$. When the $H_2S$ concentrations in the net feed streams are lower, the advantage is correspondingly reduced, but generally the $H_2S$ loss is reduced by a factor of at least five. Also, the recycle of the $NH_3$-rich aqueous solution still serve to some degree to help retain $H_2S$ in the aqueous phase so that it may be recovered via line 15 as a unitary product stream.

Although various specific embodiments of the invention have been described and shown, it is to be understood they are meant to be illustrative only and not limiting. Certain features may be changed without departing from the spirit or essence of the invention. It is apparent that the invention has broad application to the removal of $H_2S$ or $H_2S$ and $NH_3$ from aqueous solutions of the same. Accordingly, the invention is not to be construed as limited to the specific embodiments illustrated but only as defined in the following claims.

I claim:

1. A process for recovering an $H_2S$-rich stream from a first aqueous solution comprising $H_2O$, $H_2S$, $NH_3$ and dissolved methane under superatmospheric pressure according to the steps:
   (a) combining at least a portion of an $NH_3$-rich aqueous solution with the first aqueous solution to obtain a combined aqueous solution having a molar ratio of $NH_3$ to $H_2S$ of at least 1.1 moles $NH_3$ to 1.0 mole $H_2S$;
   (b) removing from the combined aqueous solution at least 80 volume percent of the dissolved methane as a gas by reducing the pressure on the combined aqueous solution to a pressure at least below 200 p.s.i.g. to thereby flash off methane;
   (c) providing at least one hour residence time for the combined aqueous solution; and then
   (d) passing the combined aqueous solution to a distillation column;
   (e) stripping $H_2S$ out of the second aqueous solution in the distillation column to obtain an $H_2S$-rich overhead stream; and
   (f) withdrawing said $NH_3$-rich aqueous solution directly from the distillation column at a point below the feed inlet to the distillation column.

2. A process according to claim 1, wherein between about 3 and 24 hours residence time is provided for the combined aqueous solution before passing the combined aqueous solution to the first distillation column.

3. A process according to claim 1, wherein at least 24 hours of residence time is provided for the combined aqueous solution before passing the combined aqueous solution to the first distillation column.

4. A process according to claim 1 wherein the combined aqueous solution is degassed first in a high pressure degasser at a pressure between 50 and 500 p.s.i.g. and then is degassed in a low pressure degasser at a pressure between 0 and 50 p.s.i.g.

5. A process according to claim 4 wherein the gross feed to the high pressure degasser comprises:
   (a) an aqueous solution of $H_2S$, $NH_3$, light hydrocarbons, and hydrogen (stream a) obtained by contacting with water the effluent from a hydroconversion process at a pressure of at least 500 p.s.i.g.,
   (b) an aqueous solution comprised of $H_2S$ and light hydrocarbons (stream b), wherein the $H_2S$ content is such that the combined streams (a) and (b) have an $NH_3$ to $H_2S$ molar ratio less than 1.1.1:1.0, and
   (c) the $NH_3$-rich aqueous solution (stream c) from the distillation column, and wherein the amount of $NH_3$ in the $NH_3$-rich aqueous solution from the distillation column is sufficient so that the combined streams (a), (b) and (c) have an $NH_3$ to $H_2S$ molar ratio of at least 1.1:1.0.

6. A process according to claim 5 wherein the $NH_3$-rich aqueous solution is withdrawn as a sidestream from the distillation column at a point between the feed inlet to and the bottoms withdrawal from the distillation column.

7. A process according to claim 4 wherein the combined aqueous solution is degassed first in a high pressure degasser at a pressure of between 70 and 200 p.s.i.g. and then is degassed in a low pressure degasser at a pressure between 1 and 10 p.s.i.g.

8. A process according to claim 1 wherein both $H_2S$ and $NH_3$ are stripped out of the second aqueous solution in the distillation column and:
   (a) the $H_2S$ and $NH_3$ stripped out of the aqueous solution is burned to form a gaseous stream comprising $SO_2$ and $N_2$; and
   (b) the gaseous stream comprising $SO_2$ and $N_2$ is fed, together with an independent $H_2S$ stream, to a sulfur production zone wherein the $SO_2$ and $H_2S$ are reacted together to form product sulfur.

9. A process according to claim 8 wherein the distillation column is operated at relatively low pressure between atmospheric and 30 p.s.i.g., and a portion of the bottoms withdrawn from the column is contacted with gaseous effluent from a hydroconversion zone so as to scrub $H_2S$ out of said gaseous effluent.

References Cited

UNITED STATES PATENTS

| | | | |
|---|---|---|---|
| 3,079,238 | 2/1963 | Handwerk | 23—181 |
| 3,096,156 | 7/1963 | Kaunert et al. | 23—181 |
| 3,335,071 | 8/1967 | Bollen et al. | 203—85 |
| 3,340,182 | 9/1967 | Berkman et al. | 23—181 |
| 3,356,608 | 12/1967 | Franklin | 208—212 |
| 3,365,374 | 1/1968 | Short et al. | 203—78 |
| 3,365,393 | 1/1968 | Wooten | 208—212 |
| 3,404,072 | 10/1968 | Bollen et al. | 23—193 |

FOREIGN PATENTS 166,743    1/1954    Australia.

WILBUR L. BASCOMB, Primary Examiner

U.S. Cl. X.R.

23—181, 193; 55—43, 55; 203—78, 79, 80, 88, 93, 98, 99